United States Patent
Tsukada et al.

(10) Patent No.: US 8,302,386 B2
(45) Date of Patent: Nov. 6, 2012

(54) EXHAUST GAS CLEANING SYSTEM FOR DIESEL ENGINE

(75) Inventors: Hidenobu Tsukada, Ushiku (JP); Kazunori Nakamura, Tsuchiura (JP); Shohei Kamiya, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 831 days.

(21) Appl. No.: 12/447,554

(22) PCT Filed: Jul. 17, 2008

(86) PCT No.: PCT/JP2008/062959
§ 371 (c)(1),
(2), (4) Date: Apr. 28, 2009

(87) PCT Pub. No.: WO2009/044581
PCT Pub. Date: Apr. 9, 2009

(65) Prior Publication Data
US 2010/0058743 A1 Mar. 11, 2010

(30) Foreign Application Priority Data
Oct. 4, 2007 (JP) ................................. 2007-260998

(51) Int. Cl.
*F01N 3/00* (2006.01)
*F01N 3/02* (2006.01)
(52) U.S. Cl. .................. 60/295; 60/286; 60/297; 60/311
(58) Field of Classification Search .................... 60/286, 60/295, 297, 303, 311; 95/283
See application file for complete search history.

(56) References Cited

U.S. PATENT DOCUMENTS

| 2004/0159099 A1* | 8/2004 | Kuboshima et al. | 60/297 |
| 2007/0044547 A1* | 3/2007 | Zhang | 73/116 |

FOREIGN PATENT DOCUMENTS

| EP | 1 852 581 A1 | 11/2007 |
| JP | 7-317529 A | 12/1995 |
| JP | 2002-227631 A | 8/2002 |
| JP | 2002-364439 A | 12/2002 |
| JP | 2004-245123 A | 9/2004 |
| JP | 2005155444 A * | 6/2005 |
| JP | 2005-188409 A | 7/2005 |
| JP | 2005-307828 A | 11/2005 |
| JP | 2005-344619 A | 12/2005 |
| JP | 2006-233833 A | 9/2006 |

OTHER PUBLICATIONS

Narita et al., English Abstract of JP 2005-155444 A, Jun. 16, 2005.*
Nishimura, Machine Translation of 2005-188409 A, Jul. 14, 2005.*

* cited by examiner

Primary Examiner — Binh Q Tran
Assistant Examiner — Audrey K Bradley
(74) Attorney, Agent, or Firm — Mattingly & Malur, PC (57) ABSTRACT

Each time a starting process for a diesel engine 2 is conducted and before the diesel engine 2 is started, any differences of the pressures P1 and P2 detected by first and second pressure sensors 21 and 22, respectively, with respect to a predetermined reference pressure value Pref, are computed and stored as first and second correction values ΔP1 and ΔP2, and then a differential pressure P12 across a particulate filter in the diesel engine 2 is computed using the pressure detection results of the first and second pressure sensors 21, 22 and the first and second correction values ΔP1, ΔP2. Thus, use of simply constructed and highly durable sensors during the detection of the differential pressure existing across the filter allows accurate measurement of this differential pressure.

6 Claims, 7 Drawing Sheets

EXHAUST GAS CLEANING SYSTEM FOR DIESEL ENGINE

TECHNICAL FIELD

The present invention relates generally to cleaning systems for exhaust gas emissions from diesel engines mounted in construction machines. More particularly, the invention concerns a diesel engine exhaust gas cleaning system adapted for computing a differential pressure across a filter and using this computed differential pressure to judge whether any particulate matter deposited in the filter is to be removed by burning-off to regenerate the filter.

BACKGROUND ART

Regulations on the exhaust gases emitted from internal combustion engines such as a diesel engine have been tightened each year. In response to the tightening of these regulations, exhaust gas filters and the technology relating to the catalysts used with the filters are also making rapid progress. For example, techniques for reducing the particulate matter (PM) included in diesel engine exhaust gases have already been developed, including the use of a diesel particulate filter (DPF).

The DPF traps the PM included in the exhaust gases emitted from a diesel engine, and thus reduces the amount of PM emitted into the atmosphere. The DPF burns and removes trapped PM deposits to recover (regenerate) the PM-trapping ability of the filter. Usually, the PM deposited in the DPF is exposed to exhaust gases of a temperature higher than a fixed level and removed by burning (this process is referred to as natural regeneration of the filter). However, when the load upon the diesel engine is light, since the temperature of the exhaust gases does not reach the high temperature level required for the combustion of the PM, the natural regeneration of the DPF does not occur and if this DPF state remains unimproved, excessive PM deposition will clog the DPF.

To prevent this situation, it is necessary, for example, to burn and remove the trapped PM by forcibly increasing the temperature of the exhaust gases at fixed time intervals, or to calculate the clogging level from the differential pressure across the DPF and if the calculated clogging level exceeds a predetermined level, forcibly burn and remove the PM.

Patent Document 1, for example, describes a technique for detecting a differential pressure across a DPF by supplying pressures from the upstream and downstream sides of the DPF through pressure-introducing lines to one differential pressure sensor and detecting the differential pressure across the DPF. Patent Document 2 describes a technique for detecting a differential pressure across a DPF by detecting pressures by means of pressure sensors provided at the upstream and downstream sides of the DPF, and taking the difference.
Patent Document 1: JP, A 2005-344619
Patent Document 2: JP, A 7-317529

DISCLOSURE OF THE INVENTION

Problems to be Solved by the Invention

Too much of a delay in the regeneration timing of the DPF behind the deposition state of PM causes thermal damage to the DPF due to rapid burning of the deposited PM. Conversely, too much of an advance in the regeneration timing deteriorates fuel efficiency. In both cases, therefore, the differential pressure across the DPF, used for computing the deposition level of PM, requires accurate detection. Using a differential pressure sensor to detect the differential pressure across a DPF, as in Patent Document 1, is disadvantageous in that, compared with an ordinary pressure sensor, the differential pressure sensor is expensive because of its complex structure, and in that the latter is relatively low in durability. In addition, using two pressure sensors, as with the technique described in Patent Document 2, makes accurate measurement of the differential pressure difficult since variations in quality characteristics between the sensors cause pressure detection accuracy errors to occur within a tolerance range.

An object of the present invention is to provide a diesel engine exhaust gas cleaning system that can measure a differential pressure across a filter accurately by using simply constructed and highly durable sensors during detection of the differential pressure across the filter.

Means for Solving the Problems (1) In order to attain the above object, in an aspect of the present invention, there is provided an exhaust gas cleaning system for a diesel engine, comprising:
a filter disposed in an exhaust system of the diesel engine in order to trap any particulate matter included in exhaust gases;
first and second pressure sensors disposed at upstream and downstream sides, respectively, of the filter; and
differential pressure computing means for computing, on the basis of pressures detected by the first and second pressure sensors, a differential pressure existing across the filter, the differential pressure across the filter computed by the differential pressure computing means being used for the system to judge whether the filter needs to be regenerated by burning off the particulate matter deposited therein;
wherein the exhaust gas cleaning system includes correction data computing means by which, each time a key switch for starting the diesel engine is turned on and before the diesel engine is started, any differences of the pressures detected by the first and second pressure sensors, with respect to a predetermined reference pressure value, are computed to obtain first and second correction values, and
correction data storage means into which the first and second correction values computed by the correction data computing means are stored; and
the differential pressure computing means is adapted to use, in addition to the pressure detection results of the first and second pressure sensors, the first and second correction values stored in the correction data storage means, to compute the differential pressure across the filter.

In this way, the differential pressure computing means uses the correction data computing means and the correction data storage means to compute the differences between the pressure detection results of the first and second pressure sensors and the predetermined reference value, as the first and second correction values, with each start of the diesel engine and store the first and second correction values. After this, the differential pressure computing means computes the differential pressure across the filter by using the pressure detection results of the first and second pressure sensors and the stored first and second correction values. Errors in the sensor-detected pressure data due to variations in quality characteristics between the sensors are thus corrected for, so the differential pressure across the filter can be measured accurately, even when two pressure sensors are used, as in the above aspect of the present invention that uses the first and second pressure sensors. In addition, since the first and second pressure sensors can be ordinary pressure sensors, the sensors can be simplified in structure and improved in durability, compared with a differential pressure sensor.

(2) In above item (1), preferably the system further includes a first temperature sensor emplaced at the upstream side of the filter, and a second temperature sensor emplaced at the downstream side of the filter, and only when a difference between temperatures detected by the first and second temperature sensors stays within respective defined data ranges, does the correction data computing means calculate the correction values and store the calculated values into the storage means.

Since the pressure sensors have temperature dependence, changes in temperature change the sensor-detected pressure data (sensor-output data), even when the pressure to be measured remains the same, such that the desired correction values based upon the detected pressure data also change.

In the present invention, more accurate measurement of the differential pressure across the filter is possible since the correction values can be calculated by detecting pressures under equal temperature conditions between the pressure sensors provided at the upstream and downstream sides of the filter.

(3) In above item (1), preferably the system further includes a first temperature sensor emplaced at the upstream side of the filter, and a second temperature sensor emplaced at the downstream side of the filter, and only when temperatures detected by the first and second temperature sensors stay within respective defined data ranges, does the correction data computing means calculate the correction values and store the calculated values into the storage means.

Thus, the correction values can be calculated by detecting pressures under equal temperature conditions between the pressure sensors provided at the upstream and downstream sides of the filter, and hence, the differential pressure across the filter can be measured more accurately.

(4) In above item (1), preferably the system further includes: display means which makes a display that prompts a start of the filter regeneration by the burning-off of the particulate matter deposited therein, when the differential pressure across the filter computed by the differential pressure computing means is higher than a required value; and manual regenerating means having a regeneration control switch, the manual regenerating means adapted to start the regeneration of the filter upon activation of the regeneration control switch.

Thus, an operator can obtain information on the particulate matter deposition state of the filter and perform the filter-regenerating process using the information.

(5) In above item (1), preferably the system further includes automatic regenerating means for conducting the regenerating process periodically by burning off the particulate matter deposited in the filter, and is constructed such that if a failure occurs in at least either the first or second pressure sensor, the correction data computing means skips the computation of the first and second correction values and the automatic regenerating means shortens execution time intervals of the regenerating process.

Thus, even if the pressure sensor failure does not allow pressure detection at the upstream and downstream sides of the filter, filter clogging can be reliably prevented since the filter-regenerating process is conducted at shorter time intervals automatically.

EFFECTS OF THE INVENTION

According to the present invention, a differential pressure across a filter can be measured accurately by using simply constructed and highly durable sensors during the detection of the differential pressure across the filter.

DESCRIPTION OF REFERENCE NUMERALS

1 Engine control system
2 Engine
2a Electronic governor
3 Exhaust pipe
4 DPF
4a Oxidizing catalyst
4b Filter
5a, 5b Temperature sensor
6a, 6b Pressure sensor
7 Regenerating fuel injector
8 Engine controller
9 Monitor controller
10 Display unit
11 Vehicle body controller
12 Vehicle body network
20 Key switch
21 First pressure sensor
22 Second pressure sensor
23 First temperature sensor
24 Second temperature sensor
25 Engine speed sensor
26 Engine control dial
27 DPF regenerating switch
30 Key switch state discriminating unit
31 First pressure computing unit
32 Second pressure computing unit
33 First temperature computing unit
34 Second temperature computing unit
35 Engine speed computing unit
36 Engine target speed computing unit
37 DPF regenerating switch state discriminating unit
40 Temperature difference computing unit
41 Sensor error discriminating unit
42 Correction data storage unit
43 Communications unit
50 Engine control unit

BEST MODE FOR CARRYING OUT THE INVENTION

Hereunder, an embodiment of the present invention will be described referring to the accompanying drawings.

Figure 1:
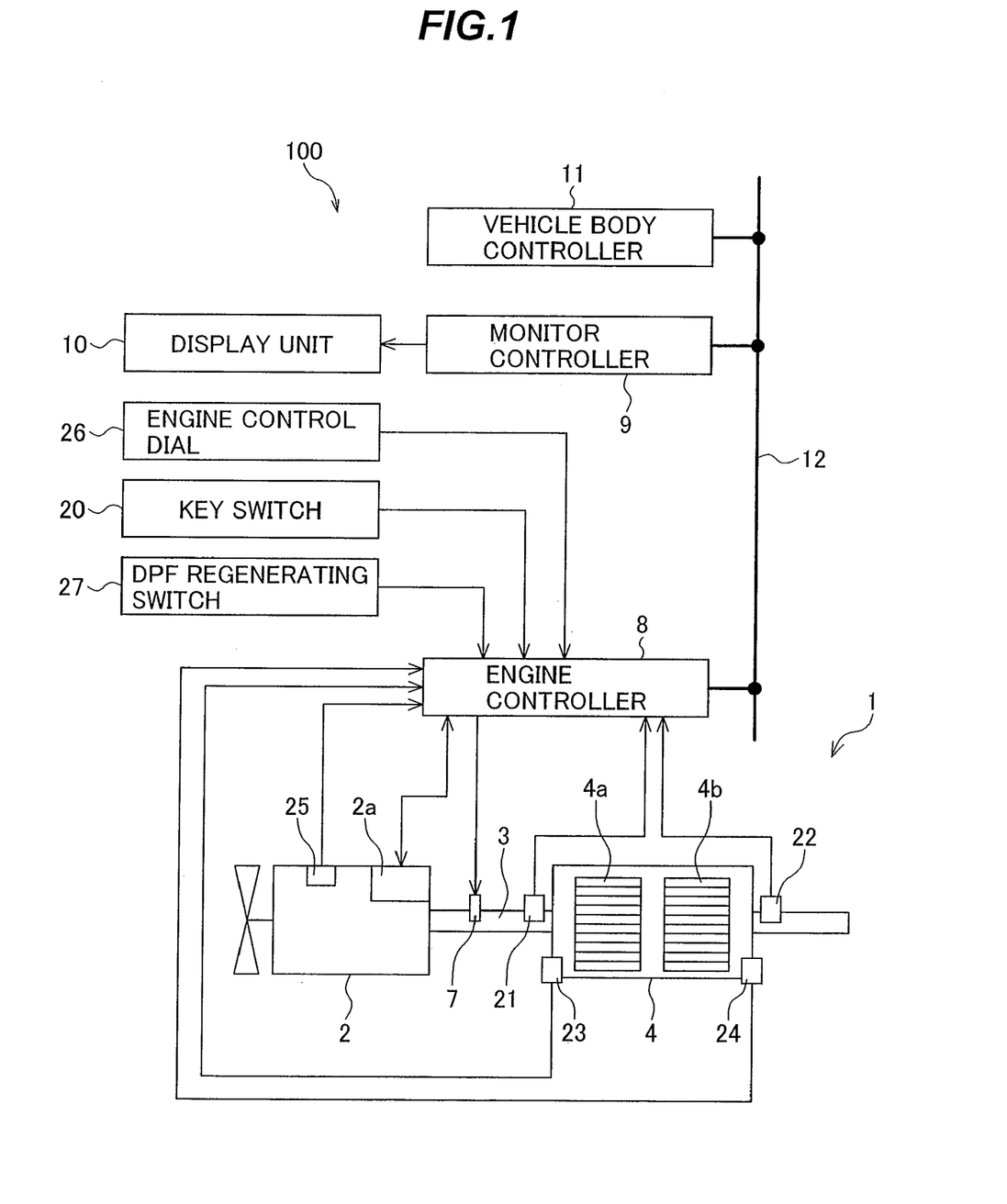
FIG. 1 is a diagram showing a system for cleaning exhaust gas emissions from an engineering vehicle engine according to an embodiment of the present invention, the diagram also showing an engine control system.

FIG. 1 is a diagram showing a system for cleaning exhaust gas emissions from an engineering vehicle according to an embodiment of the present invention, the diagram also showing an engine control system.

Referring to FIG. 1, reference numeral 2 denotes a diesel engine 2 (hereinafter, referred to simply as the engine), the engine 2 including an electronic governor 2a for controlling a speed of the engine 2, and an exhaust pipe 3 for releasing the exhaust gases from the engine 2 to the outside.

Reference numeral 100 denotes the engine control system, which includes a key switch 20 for assigning a starting instruction to the engine 2, an engine control dial 26 for specifying a target speed for the engine 2, an engine speed sensor 25 for detecting an actual speed of the engine 2, and an engine controller 8 for conducting required computing processes based upon incoming signals from the key switch 20, the engine control dial 26, and the engine speed sensor 25, and then transmitting control signals as outputs to the electronic governor 2a. The engine controller 8 is connected to a vehicle body controller 11 that controls operation of the entire engineering vehicle, and exchanges various information with the vehicle body controller 11 via a vehicle body network 12.

The engine control system 100 also has the exhaust gas cleaning system 1 of the present embodiment. The exhaust gas cleaning system 1 equipped midway in the exhaust pipe 3 includes a filter 4b for trapping any particulate matter (hereinafter, referred to simply as PM) included in the exhaust gas emissions from the engine 2, a diesel particulate filter 4 (hereinafter, referred to simply as DPF) positioned at an upstream side of the filter 4b and having an oxidizing catalyst 4a, a first temperature sensor 23 and second temperature sensor 24 for detecting internal temperatures of the exhaust pipe 3 at upstream and downstream sides, respectively, of the DPF 4, a first pressure sensor 21 and second pressure sensor 22 for detecting internal pressures of the exhaust pipe 3 at the upstream and downstream sides, respectively, of the DPF 4, and a DPF regenerating switch 27 for specifying regeneration control (described later herein) of the DPF 4. Signals from each sensor and each switch are input to the engine controller 8. The engine controller 8 uses the signals to conduct a computing process required for the exhaust gas cleaning system 1. The exhaust gas cleaning system 1 also includes a display unit 10 and a monitor controller 9 for controlling the display unit 10. The monitor controller 9 is connected to the vehicle body network 12, and various information (described later herein) that is based upon processing results of the engine controller 8 is sent to the monitor controller 9 and displayed on the display unit 10. The exhaust gas cleaning system 1 further has a regenerating fuel injector 7 at the upstream side of the DPF 4 to inject an unburnt fuel on the basis of the processing results of the engine controller 8. The key switch 20, the engine control dial 26, the DPF regenerating switch 27, and the display unit 10 are arranged in a cabin (not shown) of the engineering vehicle so as to allow easy operations by an operator.

Figure 2:
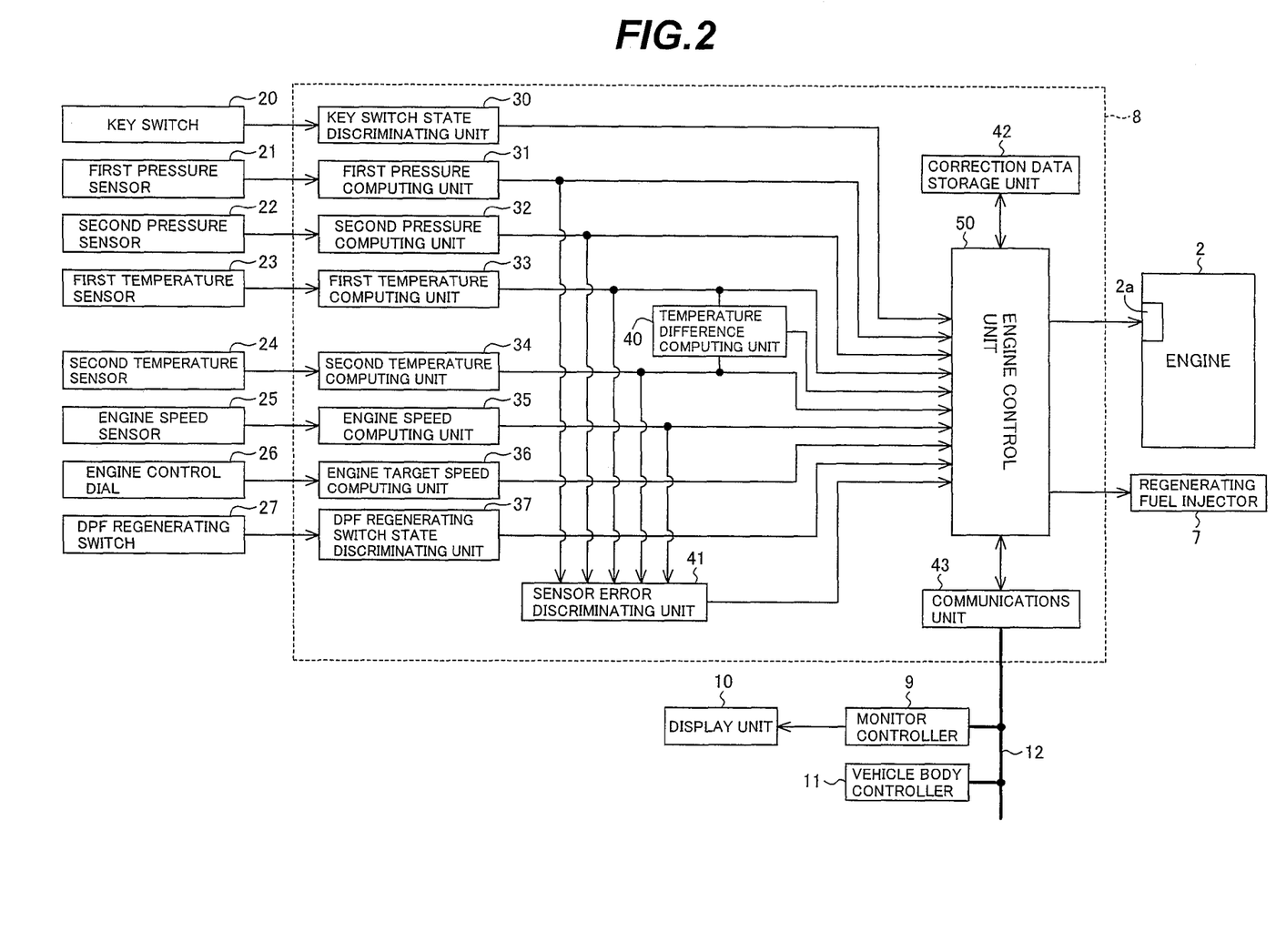
FIG. 2 is a functional block diagram that shows details of processing functions of an engine controller.

FIG. 2 is a functional block diagram that shows details of processing functions of the engine controller 8.

The engine controller 8 has functions of a key switch state discriminating unit 30, a first pressure sensor output data computing unit 31, a second pressure sensor output data computing unit 32, a first temperature sensor output data computing unit 33, a second temperature sensor output data computing unit 34, an engine speed computing unit 35, an engine target speed computing unit 36, a DPF regenerating switch state discriminating unit 37, a differential temperature computing unit 40, a sensor error discriminating unit 41, a correction data storage unit 42, an engine control unit 50, and a communications unit 43.

The key switch state discriminating unit 30 and the DPF regenerating switch state discriminating unit 37 receive switch signals as input signals from the key switch 20 and the DPF regenerating switch 27, respectively, and transmit respective discrimination results as output signals to the engine control unit 50.

The first pressure computing unit 31 and the second pressure computing unit 32 receive input signals from the first pressure sensor 21 and the second pressure sensor 22, respectively, and transmit associated computing results as a first pressure and a second pressure, respectively, to the engine control unit 50.

The first temperature sensor output data computing unit 33 and the second temperature sensor output data computing unit 34 receive input signals from the first temperature sensor 23 and the second temperature sensor 24, respectively, and transmit associated computing results as a first temperature and a second temperature, respectively, to the differential temperature computing unit 40 and the engine control unit 50.

The engine speed computing unit 35 receives an input signal from the engine speed sensor 25 and transmits associated computing results (computed engine speed) as an output signal to the engine control unit 50.

The engine target speed computing unit 36 receives a voltage signal as an input signal from the engine control dial 26 and transmits associated computing results (computed engine target speed) as an output signal to the engine control unit 50.

The sensor error discriminating unit 41 receives input signals from the first pressure computing unit 31, the second pressure computing unit 32, the first temperature computing unit 33, the second temperature computing unit 34, and the engine speed computing unit 35, and after using these signals to discriminate any errors in the sensors 21-25, transmits associated discrimination results to the engine control unit 50.

The correction data storage unit 42 acquires first pressure and second pressure correction data (described later herein) that has been computed by the engine control unit 50.

The communications unit 43 is connected to the monitor controller 9 and the vehicle body controller 11 via the vehicle body network 12. In addition to transferring information from the engine control unit 50 to the monitor controller 9 and the vehicle body controller 11, the communications unit 43 transfers information from the monitor controller 9 and the vehicle body controller 11 to the engine control unit 50.

Figure 3:
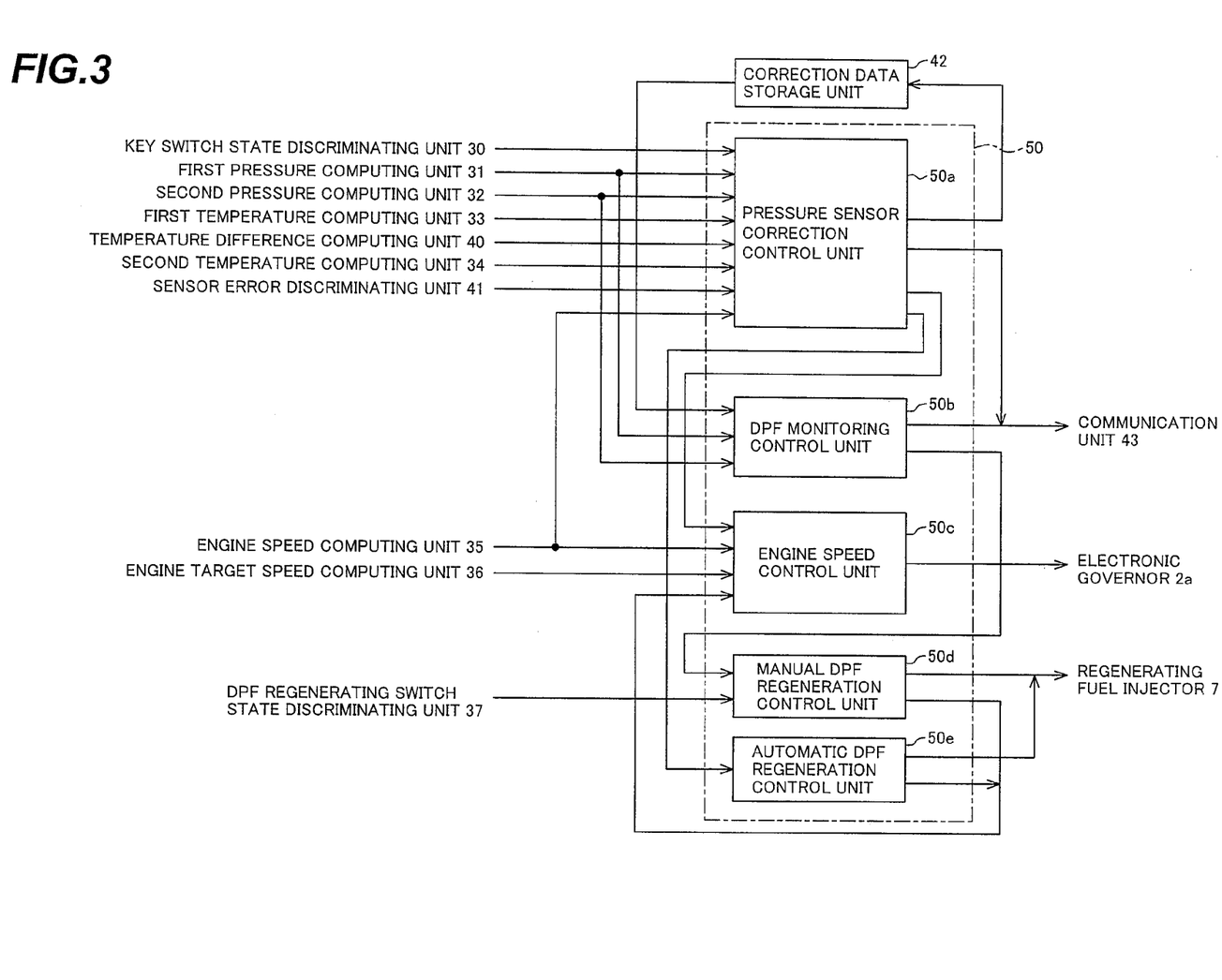
FIG. 3 is a diagram that shows an outline of processing functions of an engine control unit.

FIG. 3 is a diagram that shows an outline of processing functions of the engine control unit 50. The engine control unit 50 has functions of a pressure sensor correction control unit 50a, a DPF monitoring control unit 50b, an engine speed control unit 50c, a manual DPF regeneration control unit 50d, and an automatic DPF regeneration control unit 50e.

The pressure sensor correction control unit 50a receives the discrimination results sent from the key switch state discriminating unit 30, the computing results sent from the first pressure computing unit 31, the second pressure computing unit 32, the first temperature computing unit 33, the second temperature computing unit 34, and the temperature computing unit 40, and the discrimination results sent from the sensor error discriminating unit 41. After that, the pressure sensor correction control unit 50a conducts a required computing process and outputs control signals to the correction data storage unit 42, the communications unit 43, the engine speed control unit 50c, and the automatic DPF regeneration control unit 50e. The DPF monitoring control unit 50b receives the computing results of the first pressure computing unit 31 and the second pressure computing unit 32 and the correction data that has been stored into the correction data storage unit 42, and outputs control signals to the communications unit 43 and the manual DPF regeneration control unit 50d. The engine speed control unit 50c receives the discrimination results of the key switch state discriminating unit 30, the computing results sent from the engine speed computing unit 35 and the engine target speed computing unit 36, and the control signals sent from the pressure sensor correction control unit 50a and the manual DPF regeneration control unit 50d, and outputs a control signal to the electronic governor 2a. The manual DPF regeneration control unit 50d receives the control signal sent from the DPF monitoring control unit 50b, and the discrimination results sent from the DPF regenerating switch state discriminating unit 37, conducts a required computing process, and outputs control signals to the engine speed control unit 50c and the regenerating fuel injector 7 in order to conduct the regeneration control (described later herein) of the DPF 4. The automatic DPF regeneration control unit 50e receives a control signal from the pressure sensor correction control unit 50a and in response to this control signal, outputs control signals to the engine speed control unit 50c and the regenerating fuel injector 7 in order to conduct the regeneration control of the DPF 4, as with the manual DPF regeneration control unit 50d.

The computing processes by the pressure sensor correction control unit 50a, DPF monitoring control unit 50b, manual DPF regeneration control unit 50d, and automatic DPF regeneration control unit 50e shown in FIG. 3, are described in detail below using flowcharts of FIGS. 4 to 7.

Figure 4:
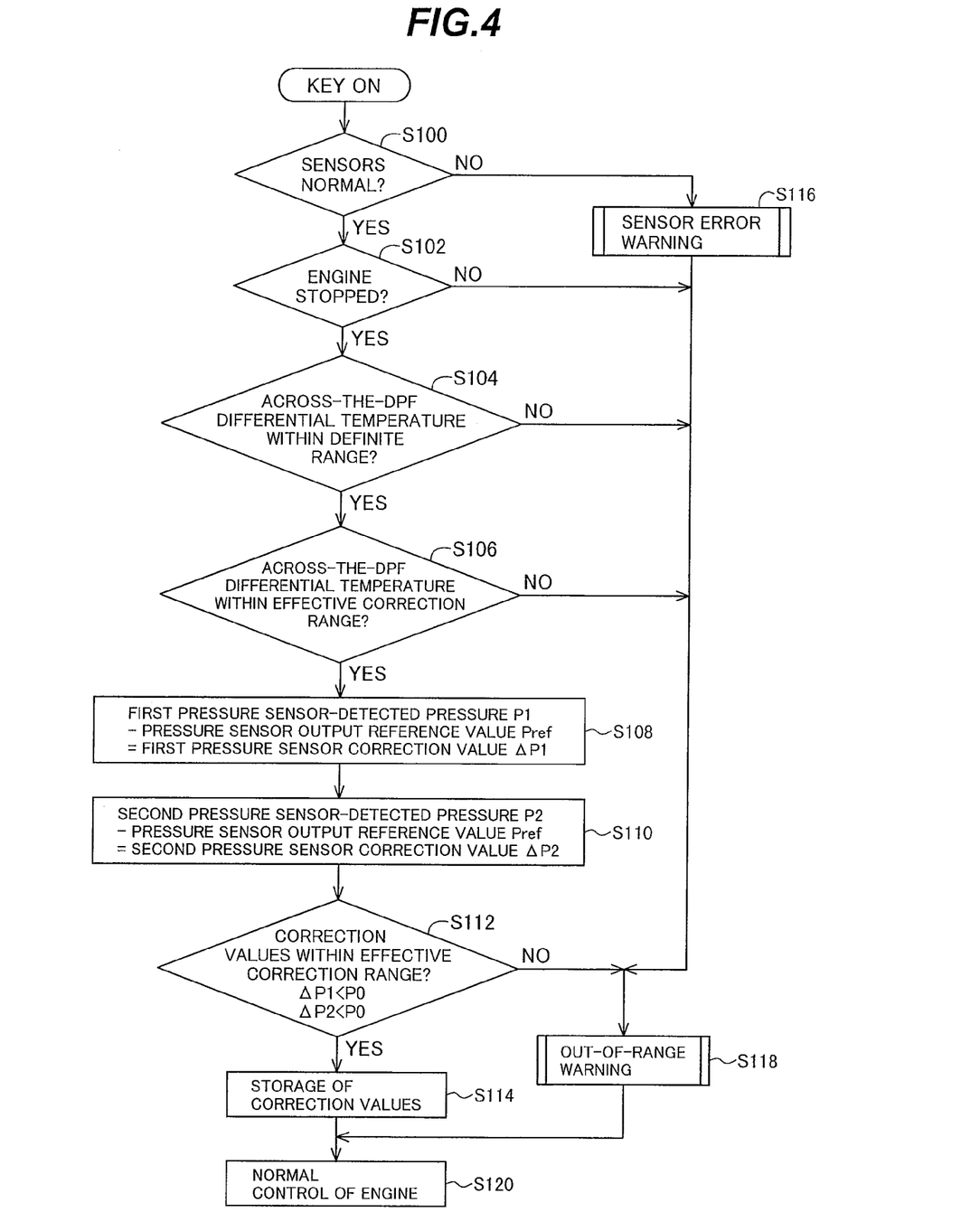
FIG. 4 is a flowchart that shows details of a computing process by a pressure sensor correction control unit.

FIG. 4 is a flowchart that shows details of the computing process by the pressure sensor correction control unit 50a. Upon a setting position change of the key switch 20 from an OFF position to an ON position, the pressure sensor correction control unit 50a conducts the computing process shown in FIG. 4. This process is conducted as a preparatory process for starting the engine 2. First, whether the sensors are normal is discriminated from the discrimination results of the sensor error discriminating unit 41 (step S100). If "Yes" is obtained as a result of the discrimination, whether the engine 2 is in a stopped state is discriminated from the computing results of the engine speed computing unit 35 (step S102). Also, whether the differential temperature across the DPF 4 is within a definite range (e.g., 0° C. to 3° C.) is discriminated from the computing results of the differential temperature computing unit 40 (step S104). Additionally, whether the temperatures at the upstream and downstream sides of the DPF 4 are both within an achievable correction range (e.g., 10° C. to 30° C.) is discriminated from the computing results of the first and second temperature computing units 33 and 34 (step S106). If all discrimination results are "Yes", correction values ΔP1 and ΔP2 for correcting the pressures detected by the first and second pressure sensors 21 and 22 are calculated in steps S108 and S110, respectively. The correction values ΔP1, ΔP2 are the differences between the pressures P1, P2 detected by the first and second pressure sensors 21, 22, and reference output pressure values Pref thereof, and these differences are calculated as follows:

Correction value ΔP1=Detected pressure P1−Reference output value Pref

Correction value ΔP2=Detected pressure P2−Reference output value Pref

The reference output values Pref of the first and second pressure sensors 21, 22 are design data for the values output from the first and second pressure sensors 21, 22 when the internal pressure of the exhaust pipe 3 is the same as an ambient atmospheric pressure. That is to say, when pressures to be measured are applied from a pressure-introducing compartment to one side of a diaphragm to which is attached a strain gauge to form part of a measuring circuit and an opposite side of the diaphragm is opened for exposure to the atmospheric pressure, the first and second pressure sensors 21, 22 detect the to-be-measured pressures relative to the atmospheric pressure. In steps S108 and S110, the to-be-measured pressures existing when equal to the atmospheric pressure are detected as relative pressures P1, P2, and any differences of these values with respect to the design data (usually, 0) are calculated as the correction values ΔP1, ΔP2.

Next, whether the two correction values, ΔP1 and ΔP2, are within predetermined correction ranges is discriminated in step S112. If "Yes" is obtained as discrimination results, the correction values ΔP1, ΔP2 are stored into the correction data storage unit 42 (step S114) and then a normal engine-control sequence is conducted (step S120). Whether the correction values ΔP1, ΔP2 are within the correction ranges means whether the values are within tolerances with respect to the design data (i.e., error ranges allowable in terms of design). In addition, if the discrimination results obtained in at least one of four steps (S102, S104, S106, S112) are "No", an out-of-range warning process is conducted in step S118, followed by the execution of the normal engine-control sequence in step S120. If the discrimination results obtained in step S100 are "No", a sensor error warning process and an out-of-range warning process are issued in steps S116 and S118, followed by the execution of the normal engine-control sequence in step S120.

During the sensor error warning process shown in step S116, a sensor error warning signal is output as a control signal to the automatic DPF regeneration control unit 50e. The sensor error warning signal is also transmitted to the monitor controller 9 via the communications unit 43 and the vehicle body network 12, and the monitor controller 9 displays a sensor error warning on the display unit 10 on the basis of the warning signal. During the out-of-range warning process shown in step S118, an out-of-range warning signal is output to the monitor controller 9 via the communications unit 43 and the vehicle body network 12, and the monitor controller 9 displays an out-of-range warning on the display unit 10 on the basis of the out-of-range warning signal.

Figure 5:
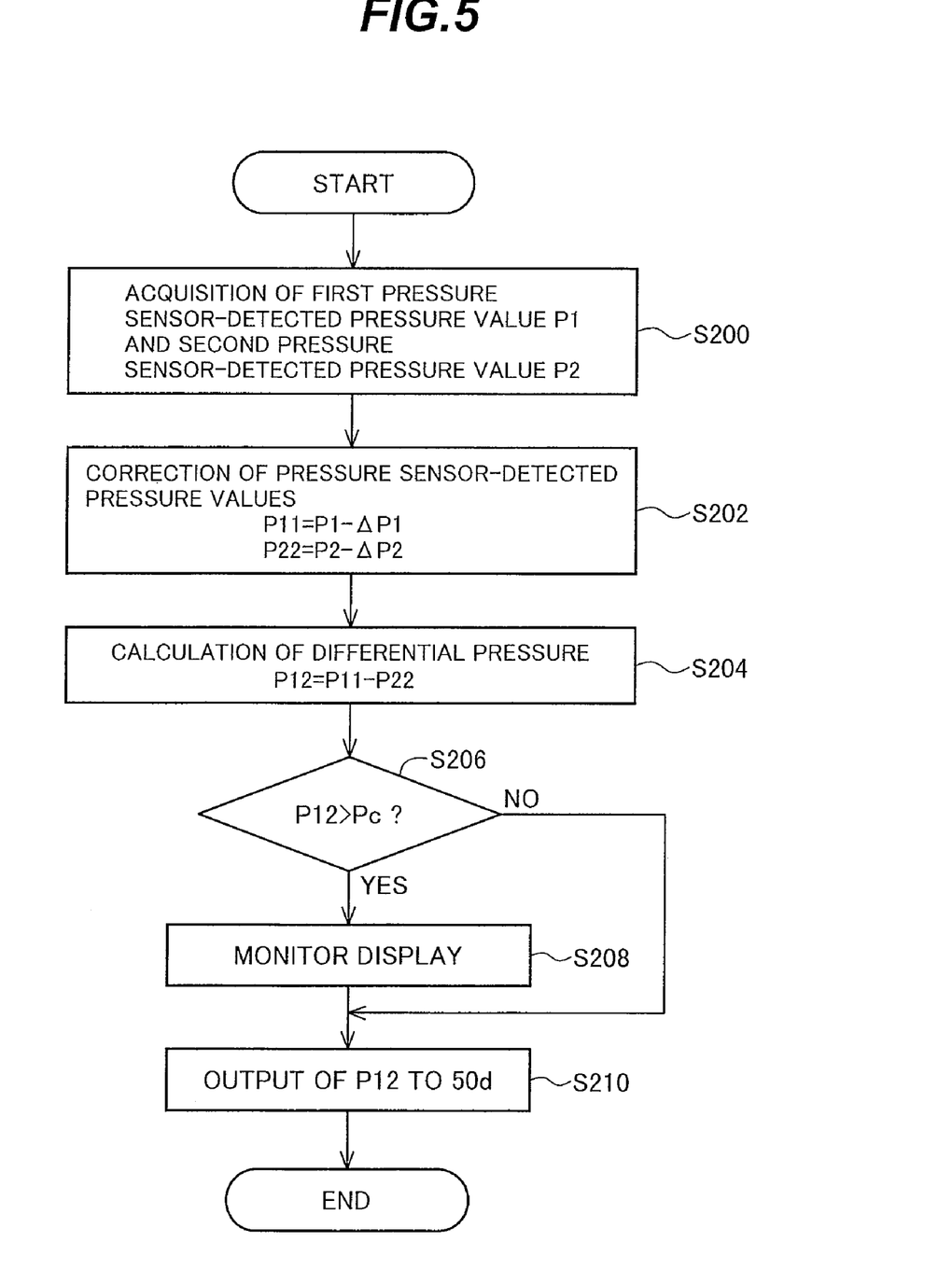
FIG. 5 is a flowchart that shows details of a computing process by a DPF monitoring control unit.

FIG. 5 is a flowchart that shows details of the computing process by the DPF monitoring control unit 50b. The DPF monitoring control unit 50b first receives the detection values P1, P2 from the first and second pressure sensors 21, 22 (step S200) and then computes correction pressures P11 and P22 by conducting the following arithmetic operations using the detection values P1, P2 and the correction values ΔP1, ΔP2 read out from the correction data storage unit 42 (step S202):

Correction pressure P11=P1−ΔP1

Correction pressure P22=P2−ΔP2

After this, the correction pressure P22 is subtracted from the correction pressure P11 to calculate the differential pressure P12 across the DPF 4 (step S204). Next, whether the differential pressure P12 is higher than a predetermined first reference differential pressure Pc is discriminated (step S206), and if discrimination results are "Yes", a manual DPF regeneration warning that prompts the operator to start manual regeneration control is displayed on the display unit 10 (step S208). Also, the differential pressure P12 is output to the manual DPF regeneration control unit 50 (step S210). This completes the computing process. Conversely to the above, if the discrimination results obtained in step S206 are "No", the differential pressure P12 is only output to the manual DPF regeneration control unit 50 (step S210). This completes the computing process. The DPF monitoring control unit 50b conducts the computing process of FIG. 5 at fixed periods (say, 0.1 second).

Figure 6:
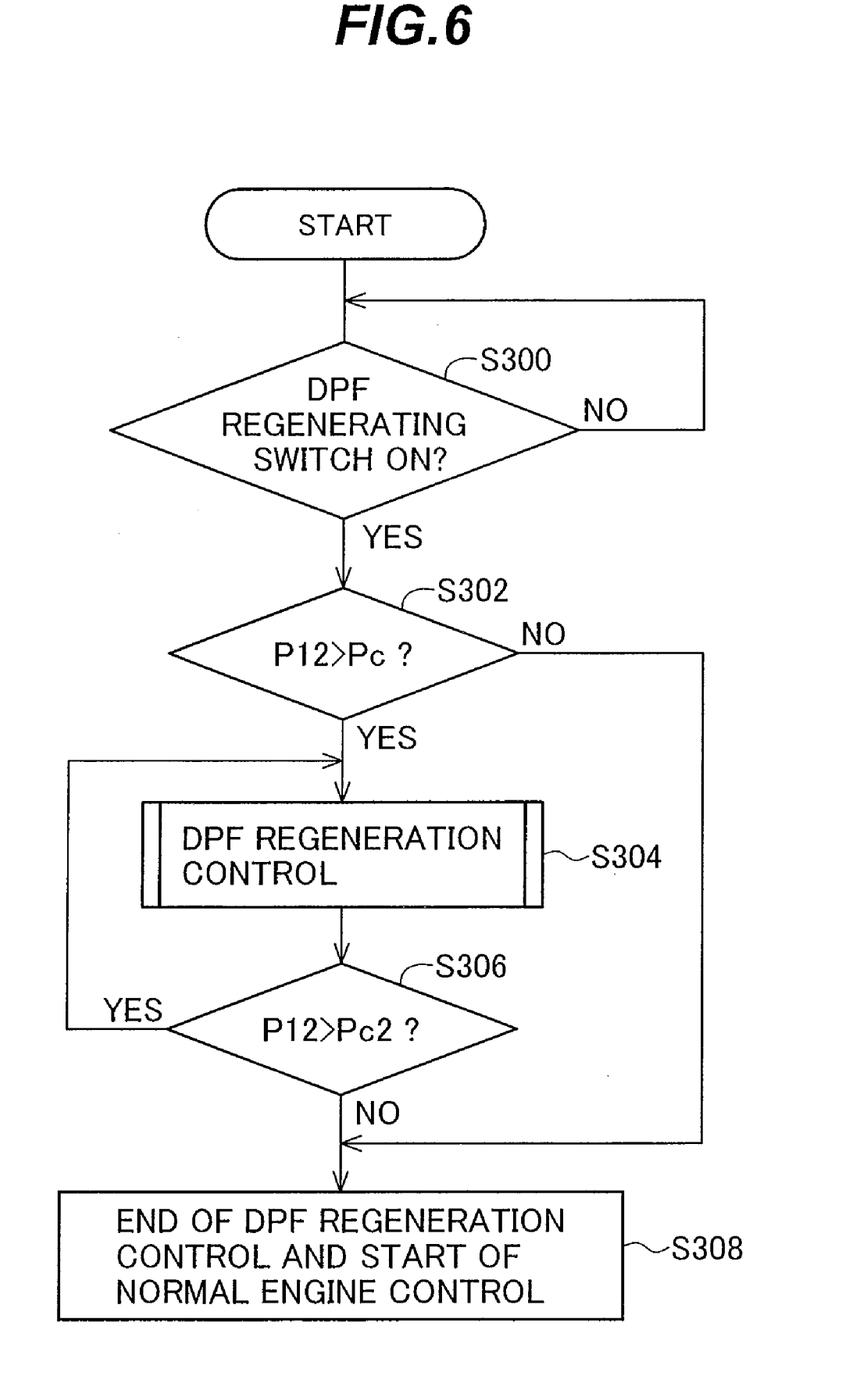
FIG. 6 is a flowchart that shows details of a computing process by a manual DPF regeneration control unit.

FIG. 6 is a flowchart that shows details of the computing process by the manual DPF regeneration control unit 50d. The manual DPF regeneration control unit 50d first discriminates in step S300 whether the DPF regenerating switch 27 is in a turn-on state. If discrimination results are "No", the control unit 50d repeats the process, or if the discrimination results are "Yes", discriminates in step S302 whether the differential pressure P12 across the DPF 4, output from the DPF monitoring control unit 50b in step S210 of FIG. 5, is higher than the first reference differential pressure Pc. If discrimination results on P12 are "Yes", the control unit 50d conducts DPF regeneration control in step S304. Additionally, the control unit 50d discriminates in step S306 whether the differential pressure P12 is higher than a second reference differential pressure Pc2. If discrimination results are "Yes", the control unit 50d repeats steps S304 and S306. If "No" is obtained as a result of the discrimination in step S306, the control unit 50d terminates DPF regeneration control and conducts normal engine control in step S308. This also applies if "No" is obtained as a result of the discrimination in step S302. The control of DPF regeneration is conducted to forcibly increase a temperature of the exhaust gases and burn off the PM that has been trapped by the filter 4b. For example, the engine speed is maintained at a required level (e.g., 1,800 rpm), then the exhaust gas temperature is increased, and an unburnt fuel is injected under this state from the regenerating fuel injector 7 into the exhaust pipe 3. Thus, the unburnt fuel is burnt with the aid of the oxidizing catalyst 4a within the DPF 4, and the filter-trapped PM is removed using the combustion heat.

Figure 7:
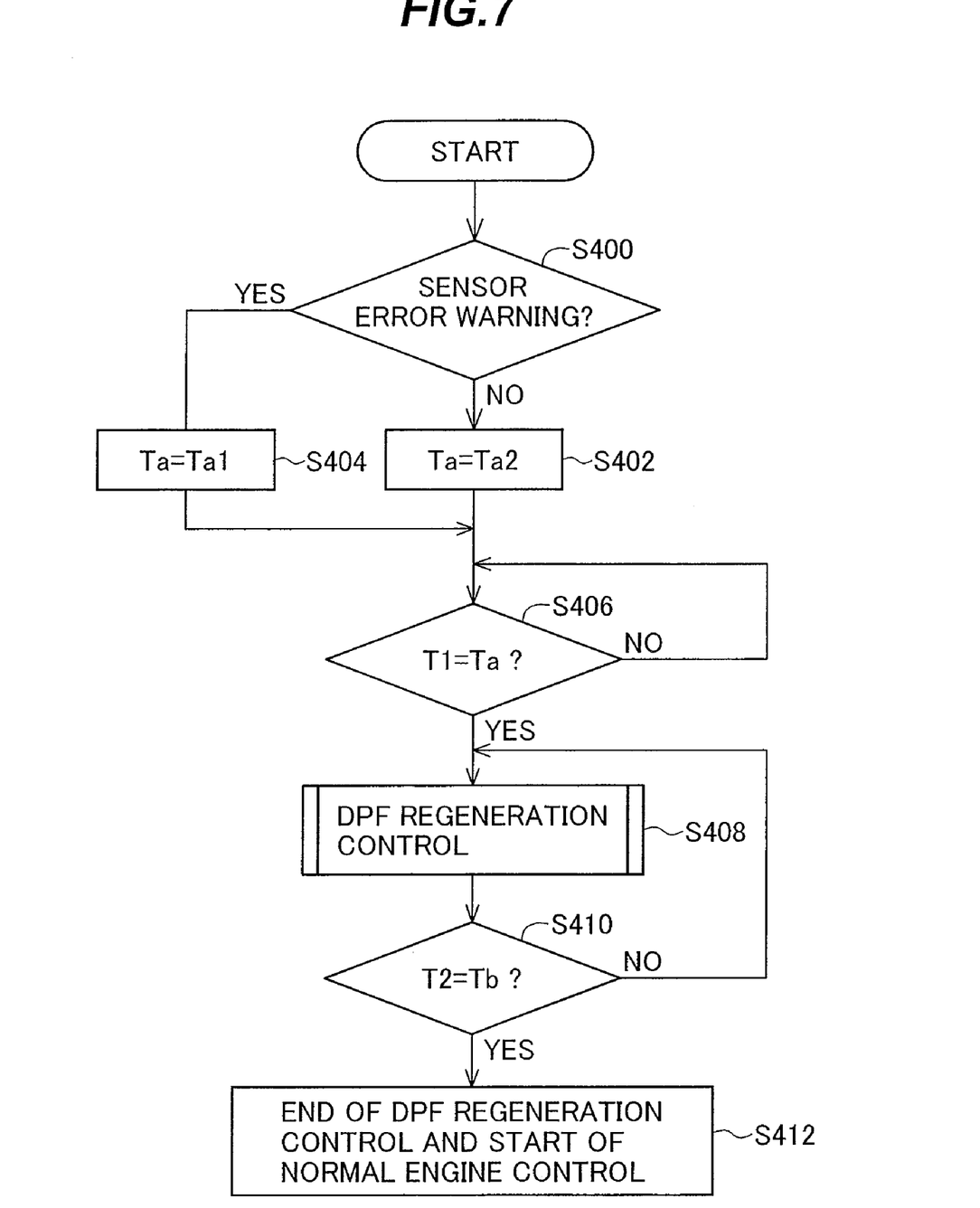
FIG. 7 is a flowchart that shows details of the computing process by the manual DPF regeneration control unit.

FIG. 7 is a flowchart that shows details of the computing process by the automatic DPF regeneration control unit 50e. The automatic DPF regeneration control unit 50e first discriminates in step S400 whether the sensor error warning signal from the pressure sensor correction control unit 50a is on. If "No" is obtained as a result of the discrimination, the control unit 50e assigns a reference time Ta=Ta1 in step S402, or if "Yes" is obtained as a result of the discrimination, the control unit 50e assigns a reference time Ta=Ta2 in step S404. Next, the control unit 50e discriminates in step S406 whether an elapsed time T1 from previous DPF regeneration control is in excess of the reference time Ta. If "No" is obtained as a result of the discrimination, the discrimination in step S406 is conducted again. If the discrimination results in step S406 are "Yes", the control unit 50e starts DPF regeneration control in step S408 and discriminates in step S410 whether an elapsed time from the start of DPF regeneration control has exceeded a preassigned time Tb. If "No" is obtained as a result of the discrimination, DPF regeneration control in step S408 is conducted again and the discrimination in step S410 is repeated. If the discrimination results in step S410 are "Yes", DPF regeneration control is completed and normal engine control is conducted in step S412.

In the above, the pressure sensor correction control unit 50a of the engine control unit 50 forms a correction data computing element by which, with each start of the engine 2 by turn-on operations of the key switch 20, the differences of the pressures detected by the first and second pressure sensors 21, 22, with respect to the predetermined reference values, are computed as first and second correction values before the engine 2 is started, and the correction data storage unit 42 forms a correction data storage element for storage of the first and second correction values computed by the correction data computing element (the pressure sensor correction control unit 50a). Also, the DPF monitoring control unit 50b forms a differential pressure computing element for computing the differential pressure across the filter on the basis of the pressures detected by the first and second pressure sensors, and the differential pressure computing element computes the differential pressure across the filter by using the pressure detection results of the first and second pressure sensors and the first and second correction values stored in the correction data storage element.

Operation of the thus-constructed present embodiment is described below.

(Engine Start)

A change of the key switch 20 from the OFF position to the ON position by the operator causes the key switch state discriminating unit 30 to discriminate the turn-on state of the key switch 20 and results of the discrimination to be input to the pressure sensor correction control unit 50a of the engine control unit 50. Upon receiving the discrimination results, the sensor correction control unit 50a conducts the starting process for the engine 2 and starts the computing process shown in FIG. 4. That is to say, control unit 50a first discriminates whether the sensors 21 to 25 are all normal, whether the engine 2 is in a stopped state, whether the exhaust gas temperatures at the upstream and downstream sides of the DPF 4, within the exhaust pipe 3, are within a predetermined range, and whether the difference between the exhaust gas temperatures at the upstream and downstream sides of the DPF 4, within the exhaust pipe 3, is within a predetermined range. If all discrimination results are "Yes", the correction values ΔP1 and ΔP2 of the first and second pressure sensors 21 and 22 are calculated in steps S100, S102, S104, and S106, in that order, of FIG. 4. After this, if the calculated correction values ΔP1, ΔP2 are within predetermined ranges, the correction values are stored into the correction data storage unit 42 in steps S112 and S114 of FIG. 4 and then normal starting control for the engine 2 is conducted in step S120 of FIG. 4. However, if even one of the sensors 21 to 25 is abnormal, or if the exhaust gas temperatures at the upstream and downstream sides of the DPF 4, within the exhaust pipe 3, are outside the predetermined range, or if the difference between the exhaust gas temperatures at the upstream and downstream sides of the DPF 4, within the exhaust pipe 3, is outside the predetermined range, the out-of-range warning is displayed on the display unit 10 in step S118 and normal engine control is conducted in step S120. Additionally, if any one of the sensors 21-25 is abnormal, the sensor error warning is displayed on the display unit 10 and the sensor error warning control signal is output to the automatic regeneration control unit (not shown) for the DPF 4. This is followed by engine starting control (steps S116, S118, and S120 of FIG. 4).

In this manner, the correction values ΔP1, ΔP2 of the pressure sensors 21, 22 arranged at the upstream and downstream sides of the DPF 4 are calculated and then the calculated correction values are used to correct the pressures P1, P2 detected by the pressure sensors 21, 22. More accurate values P11, P22 are therefore obtainable as pressure detection results.

The correction values ΔP1, ΔP2 of the first and second pressure sensors 21, 22 are calculated, only if a differential temperature between the upstream and downstream sides of the DPF 4 is within a predefined range. Since the pressure sensors 21, 22 have temperature dependence, the pressures P1, P2 detected by the sensors will change according to temperature, so the correction values ΔP1, ΔP2 calculated using the sensor-detected pressure data will also be affected by the temperature. More accurate values P11, P22 can therefore be obtained as pressure detection results by calculating the correction values ΔP1, ΔP2, only when the differential temperature across the DPF 4 is within the predefined range (i.e., only under equal temperature conditions).

In addition, only when the temperatures of the pressure sensors 21, 22 arranged at the upstream and downstream sides of the DPF 4 meet the predefined temperature conditions, will the pressures P1, P2 be detected and the correction values ΔP1, ΔP2 calculated. More accurate values P11, P22 can therefore be obtained as pressure detection results.

(Normal Operation)

1. DPF Monitoring Control

After the engine start, during normal operation, the differential pressure P12 across the DPF 4 is computed and monitored by the DPF monitoring control unit 50b. In this case, the DPF monitoring control unit 50b reads out from the correction data storage unit 42 the correction values ΔP1, ΔP2 of the pressure sensors 21, 22 that have been computed during the engine start, and after using these computed correction values ΔP1, ΔP2 to correct the sensor-detected pressures P1, P2 and calculate the pressures P11, P22, uses the calculated pressures P11, P22 to calculate the differential pressure P12 across the DPF 4 (steps S200-S204 of FIG. 5). In this way, the detected pressures P1, P2 are corrected using the correction values ΔP1, ΔP2 and then the differential pressure P12 across the DPF 4 is calculated using the corrected pressures P11, P22, so the differential pressure across the DPF 4 can be measured accurately.

The thus-obtained differential pressure P12 is compared with the first reference differential pressure Pc. If the differential pressure P12 is lower than the first reference differential pressure Pc, no processing occurs, or if the differential pressure P12 is higher than the first reference differential pressure Pc, the amount of PM deposited in the DPF 4 is regarded as exceeding a predefined level. In this latter case, the display unit 10 displays the manual regeneration warning to prompt the operator to start manual regeneration (steps S206 and S208 of FIG. 5). The process of steps S200 to S210 is executed periodically, for example, at fixed intervals of 0.1 second.

2. Automatic DPF Regeneration Control

After the engine start, during normal operation, automatic DPF regeneration control by the automatic DPF regeneration control unit 50e is conducted concurrently with the above-described DPF monitoring control by the DPF monitoring control unit 50b.

During normal operation with the sensor error warning control signal off, the regeneration of the DPF 4 is controlled periodically (e.g., every three hours) by the automatic DPF regeneration control unit 50e, regardless of the amount of PM deposited or other conditions. When the sensor error warning control signal is on, an execution time interval of DPF regeneration control is shortened to two hours, for example, and the regeneration of the DPF 4 is controlled at this time interval.

Decreases in PM-trapping capability, caused by clogging due to PM deposition, can be suppressed, even when the deposition state of PM in the DPF 4 cannot be accurately detected for reasons such as the above-described sensor error occurring. In addition, a delay in the regeneration of the DPF 4 against the deposition level of the PM can be avoided, and hence, thermal damage to the DPF 4 due to rapid PM burning can be avoided.

3. Manual DPF Regeneration Control

After the engine start, if the manual regeneration warning is displayed on the display unit 10 by the DPF monitoring control unit 50b, the operator controls the manual regeneration control unit 50d by pressing the DPF manual regenerating switch 27 to control the regeneration of the DPF 4.

A press of the DPF manual regenerating switch 27 by the operator starts DPF regeneration control, which is then continued until the differential pressure P12 across the DPF 4 has decreased below the predetermined second reference differential pressure Pc2 at which the PM deposited in the DPF 4 is judged to have been removed. After confirmation of the decrease in the differential pressure, DPF regeneration control is completed (steps S300 to S310 of FIG. 6).

A press of the DPF manual regenerating switch 27 by the operator without the manual regeneration warning being displayed on the display unit 10 does not start DPF regeneration control (steps S302 to S308 of FIG. 6).

As can be seen from the above, the manual regeneration warning lets the operator know that it has become necessary to regenerate the DPF 4, and allows the operator to start manual DPF regeneration. Decreases in PM-trapping capability, caused by clogging due to PM deposition, therefore, can be suppressed. In addition, a delay in the regeneration of the DPF 4 against the deposition level of the PM can be avoided, and hence, thermal damage to the DPF 4 due to rapid PM burning can be avoided.

As described above, according to the present embodiment, the pressures P1, P2 that have been detected by the pressure sensors 21, 22 provided at the upstream side and downstream side, respectively, of the DPF 4 are corrected using the first and second correction values that have been computed by the pressure sensor correction control unit 50a and stored into the correction data storage unit 42, and the differential pressure across the DPF 4 is calculated from the corrected pressures P11, P22, so the differential pressure across the DPF 4 can be measured accurately, even during the use of two pressure sensors (the first and second pressure sensors). In addition, since the first and second pressure sensors 21, 22 can be ordinary pressure sensors, the sensors can be simplified in structure and improved in durability, compared with a differential pressure sensor.

Furthermore, since the first correction value ΔP1 and the second correction value ΔP2 are calculated only when a difference in ambient temperature between the pressure sensors 21, 22 at the upstream and downstream sides of the DPF 4 is within a predefined data range, relative errors in the correction values ΔP1, ΔP2 due to the difference in ambient temperature between the pressure sensors 21, 22 can be suppressed and thus the differential pressure across the DPF 4 can be measured more accurately.

Furthermore, since the first correction value ΔP1 and the second correction value ΔP2 are calculated only when the ambient temperatures of the pressure sensors 21, 22 provided at the upstream and downstream sides of the DPF 4 are within predefined respective data ranges, relative errors in the correction values ΔP1, ΔP2 can be suppressed and thus the differential pressure across the DPF 4 can be measured more accurately.

Moreover, when the differential pressure P12 across the DPF 4, measured under the control of the DPF monitoring control unit 50b, is higher than the predetermined value, that is, when the deposition of PM reaches the level at which the regeneration of the DPF 4 becomes necessary, since the display of the appropriate information on the display unit 10 prompts the operator to start the regeneration process and causes the operator to start manual regeneration of the DPF 4 in accordance with the information, timely regeneration of the DPF 4 can be conducted according to the particular deposition state of the PM. This prevents unnecessary regeneration, hence minimizing fuel consumption. Thermal damage to the DPF 4 due to regeneration under an excessive deposition state of PM can also be avoided.

Besides, since the automatic DPF regeneration control unit 50e regenerates the DPF 4 periodically and since the control unit 50e shortens the automatic regeneration time interval in the event of a failure in at least one of the first and second pressure sensors 21, 22, filter clogging can be reliably prevented, even if the failures make the pressure sensors 21, 22 unable to detect the pressures at the upstream or downstream sides of the filter.

The invention claimed is:

1. An exhaust gas cleaning system for a diesel engine, comprising:
    a filter disposed in an exhaust system of the diesel engine in order to trap any particulate matter included in exhaust gases;
    first and second pressure sensors disposed at upstream and downstream sides, respectively, of said filter; and
    differential pressure computing means for computing, on the basis of pressures detected by said first and second pressure sensors, a differential pressure existing across said filter, the differential pressure across said filter computed by said differential pressure computing means being used for the system to iudge whether said filter needs to be regenerated by burning off the particulate matter deposited therein;
    wherein said exhaust gas cleaning system includes
    correction data computing means by which, each time a key switch for starting the diesel engine is turned on and before the diesel engine is started, any differences of the pressures detected by said first and second pressure sensors, with respect to a predetermined reference pressure value, are computed to obtain first and second correction values, and
    correction data storage means into which the first and second correction values computed by said correction data computing means are stored; and
    said differential pressure computing means is adapted to use, in addition to the pressure detection results of said first and second pressure sensors, the first and second correction values stored in the correction data storage means, to compute the differential pressure across said filter,
    a first temperature sensor emplaced at the upstream side of said filter; and
    a second temperature sensor emplaced at the downstream side of said filter,
    wherein, only when a difference between temperatures detected by the first and second temperature sensors is within a defined data range, does said correction data computing means calculate the correction values and store the calculated values into the correction data storage means.

2. The exhaust gas cleaning system for the diesel engine according to claim 1, further comprising:
    display means which makes a display that prompts a start of said filter regeneration by the burning-off of the particulate matter deposited therein, when the differential pressure across said filter computed by said differential pressure computing means is higher than a required value; and
    manual regenerating means having a regeneration control switch, said manual regenerating means adapted to start the regeneration of said filter upon activation of the regeneration control switch.

3. The exhaust gas cleaning system for the diesel engine according to claim 1, further comprising:
    automatic regenerating means for conducting periodically the regeneration of said filter by burning off the particulate matter deposited therein,
    wherein if a failure occurs in at least one of said first and second pressure sensors, said correction data computing means skips the computation of the first and second correction values; and
    the automatic regenerating means shortens an execution time interval of the regeneration.

4. An exhaust gas cleaning system for a diesel engine, comprising:
    a filter disposed in an exhaust system of the diesel engine in order to trap any particulate matter included in exhaust gases;
    first and second pressure sensors disposed at upstream and downstream sides, respectively, of said filter; and
    differential pressure computing means for computing, on the basis of pressures detected by said first and second pressure sensors, a differential pressure existing across said filter, the differential pressure across said filter computed by said differential pressure computing means being used for the system to judge whether said filter needs to be regenerated by burning off the particulate matter deposited therein;
    wherein said exhaust gas cleaning system includes
    correction data computing means by which, each time a key switch for starting the diesel engine is turned on and before the diesel engine is started, any differences of the pressures detected by said first and second pressure sensors, with respect to a predetermined reference pressure value, are computed to obtain first and second correction values, and
    correction data storage means into which the first and second correction values computed by said correction data computing means are stored; and
    said differential pressure computing means is adapted to use, in addition to the pressure detection results of said first and second pressure sensors, the first and second correction values stored in the correction data storage means, to compute the differential pressure across said filter,
    a first temperature sensor emplaced at the upstream side of said filter; and
    a second temperature sensor emplaced at the downstream side of said filter,
    wherein, only when temperatures detected by the first and second temperature sensors are within respective defined data ranges, does said correction data computing means calculate the correction values and store the calculated values into the correction data storage means.

5. The exhaust gas cleaning system for the diesel engine according to claim 4, further comprising:
    display means which makes a display that prompts a start of said filter regeneration by the burning-off of the particulate matter deposited therein, when the differential pressure across said filter computed by said differential pressure computing means is higher than a required value; and manual regenerating means having a regeneration control switch, said manual regenerating means adapted to start the regeneration of said filter upon activation of the regeneration control switch.

6. The exhaust gas cleaning system for the diesel engine according to claim 3, further comprising:

automatic regenerating means for conducting periodically the regeneration of said filter by burning off the particulate matter deposited therein, wherein if a failure occurs in at least one of said first and second pressure sensors, said correction data computing means skips the computation of the first and second correction values; and the automatic regenerating means shortens an execution time interval of the regeneration.

\* \* \* \* \*